United States Patent [19]
Clavel

[11] Patent Number: 5,931,389
[45] Date of Patent: Aug. 3, 1999

[54] SELF-COMPENSATING DROPPER FOR UNDERGROUND IRRIGATION

[75] Inventor: Juan Vives Clavel, Albuixech, Spain

[73] Assignee: Plasticos Mondragon, S.A., Albuixech, Spain

[21] Appl. No.: 09/028,320

[22] Filed: Feb. 24, 1998

[30] Foreign Application Priority Data

Feb. 25, 1997 [ES] Spain ..................................... 9700396

[51] Int. Cl.⁶ ................................................. B05B 15/00
[52] U.S. Cl. ........................ 239/542; 239/533.13; 239/547
[58] Field of Search ................................. 239/104, 106, 239/533.13, 542, 547

[56] References Cited

U.S. PATENT DOCUMENTS

| | | | |
|---|---|---|---|
| 3,746,263 | 7/1973 | Reeder et al. | 239/542 |
| 3,841,349 | 10/1974 | Todd | 239/542 X |
| 3,926,375 | 12/1975 | Reeder et al. | 239/542 |
| 4,059,228 | 11/1977 | Werner | 239/106 |
| 5,279,460 | 1/1994 | Yu | 239/542 X |

*Primary Examiner*—Andres Kashnikow
*Assistant Examiner*—Robin O. Evans
*Attorney, Agent, or Firm*—Helfgott & Karas, P.C.

[57] ABSTRACT

The object of the present invention is constituted by an improved self-compensating dropper, for underground irrigation, which is provided at its out-put mouth (1) with a spherical valve (2), of irreversible unidirectional flow in the out-put direction, though it prevents the entrance to its interior, of earth or gravel which might obstruct it or make it unusable. The sphere (2) is retained by a central stop (6) joined to the body of the dropper by attachment lugs (5), among which there are orifices (4) in the shape of circular crown segments through which the irrigation water may flow.

1 Claim, 1 Drawing Sheet

SELF-COMPENSATING DROPPER FOR UNDERGROUND IRRIGATION

OBJECT OF THE INVENTION

The object to which the invention refers and which is protected under the present Patent of Invention, consists of an improved self-compensating dropper for undergound irrigation.

BACKGROUND OF THE INVENTION

The frequent scarcity of hydraulic resources intended for the irrigation of agricultural crops demands—and shall increasingly demand—a careful and sever administration of the same, using the suitable technical means to make compatible, a sever regulation of its consumption with the satisfaction of the hydric requirements of said crops.

Among the said means must be pointed out the drop irrigation, a method which consists of the distribution of water through a flexible pipe network, extended on the surface, in which a liquid out-put element is intercalated (dropper) which regulates it drop by drop, placed in such a way, that the debit is produced at the necessary location, that is to say, in the proximity of the stem of the plant or trunk of the tree being watered, so that it may absorb the water through the roots, with a practically total exploitation.

The out-put flow supplied by the dropper is proportional to the pressure of the fluid at the point of the pipe in which it is assembled; and the out-put section of all the droppers being constant in all the droppers whilst the pressure is variable depending on the height of the ground in which a determined dropper is installed, it results that, when the cultivated ground presents accentuated uneveness (for example, in layered cultivations) the droppers placed at low heights supply more water than those at high levels, with more and better benefit in the irrigation to the vegetables served and creating irregularities in the growth and production of the crop.

This disadvantage has been solved with the self-compensating droppers, in which the out-put section varies with reverse proportionality as regards the variations of the pressure, achieving that the irrigation flow is kept practically constant. This is attained by means of the use of a peripherical elastic membrane which supports on its exterior face the water pressure in the pipe in which the dropper is inserted, whilst on its internal face, adjacent to the out-put orifice, a reduced pressure acts when the liquid passes through a labyrinth which causes load loss.

With this arrangement, if the pressure in the piping system is relatively high at the point of insertion of the dropper, the membrane comes near the out-put orifice, reducing the feeding chamber and the pouring flow, acting in reverse if the pressure in the piping system is relatively low.

On the other hand, the conventional distribuition networks, extended on the surface, on the ground, are very vulnerable to land tilling operations, both manual and mecanical, increasing the risk of breakage of the piping system in this latter case due to circulation of agricultural vehicles.

Additionally, the effectiveness of the system may be negatively affected not only by the breaking of the piping system, but simply by its positional variation. In effect, the optical exploitation of the irrigation is conditioned by the proximity of the drop to the roots of the plant, in such a manner, that if the dropper is displaced from its position, which should be fixed and unvariable because the roots grow towards the wet ground and in the same, the irrigation may be wasted since it does not coincide with the majoritary and normal situation of the roots.

Due to all these reasons, the current tendency of the art is that of burying the piping systems with their droppers, creating underground distribution networks, with which its unvulnerability and immobility is obtained, with all the advantages inherent to the same.

However, this system also present a problem: the obstruction of the droppers when, due to a variation of the pressure in the piping systems, the liquid circulation direction is reversed in them, creating a depression at the out-put mouth of the dropper and a suction which, since the dropper is buried causes the penetration of earth in the same making it unusable.

DESCRIPTION OF THE INVENTION

The purpose of the invention which constitutes the object of this Patent of Invention, is the elimination of the disadvantage which is adherent to the previously described system known as subterranean irrigation with self-compensating droppers, having been conceived and designed in compliance with this purpose.

The improvement of the droppers consists in the arrangement on its out-put mouth of an elastic material spherical valve, with unidirectional flow, placed in such a manner, that it permits the out-put of liquid but prevents the reversion of its circulation direction.

The elastic sphere rises from its conical seat, pushed by the liquid vein, leaving it flow through the orifices in the shape of circular crown segments which remain among the attachment lugs of a central retention stop of the sphere.

If the reversal of the flow circulation direction is produced, the elastic sphere compresses against its conical seat, closing the entrance to the dropper and preventing access into its interior to the gravel which might obstruct it.

BRIEF DESCRIPTION OF THE DRAWINGS

In order to complement the description of the invention and to facilitate the interpretation of the characteristics related to the shape, as well as to the structure and functionality, drawings are enclosed in which different aspects are schematically represented of a preferred embodiment of the improved self-compensating dropper for undergound irrigation, which constitutes the object of the present Invention.

In said drawings.

DESCRIPTION OF A PREFERRED EMBODIMENT

Figure 1:
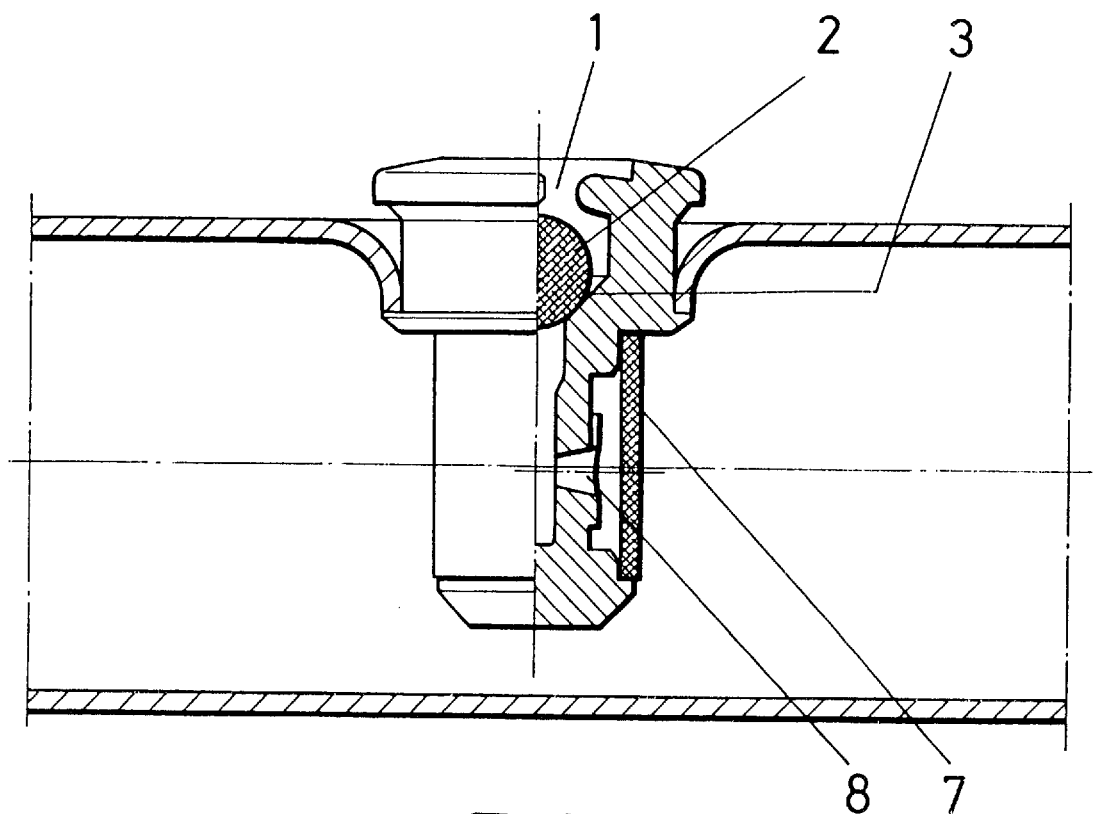
FIG. 1 shows a side elevational view and in half-section, of the improved dropper.
Figure 2:
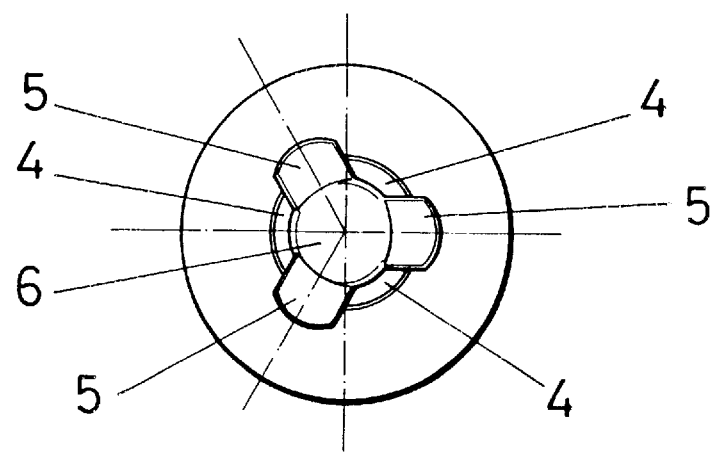
FIG. 2 is a plan view of the same.

To show clearly the nature and the scope of the advantageous application of the improved self-compensating dropper for underground irrigation, which constitutes the object of the invention, its structure and operation are herewith described, making reference to the drawings which, since they represent a preferred embodiment of said object, with informative character, must be considered in the widest and non limitative sense of the application and the contents of the invention.

The improved self-compensating dropper, for underground irrigation, is provided at its out-put mouth (1) with a valve constituted by a sphere (2) of elastic material, with conical seat (3), placed in such a manner, that it permits the exit of the liquid when it rises from its seat pushed by the liquid vein, which flows through orifices (4) in the shape of circular crown segments, which remain between the attachment lugs (5) of a central stop (6) for retention of the sphere.

If the circulation direction of the flow is reversed, the elastic sphere (2) compresses against its conical seat (3), closing the entrance to the dropper.

The known basic element, self-compensating dropper, is provided with the elastic peripherical membrane (7) which supports on its external face, the pressure of the liquid in the piping system in which it is inserted, whilst on its internal face, which confronts the drop regulation orifice (8), a reduced pressure acts due to the passage of the liquid through a labyrinth Once the nature and the operational scope of the invention have been sufficiently described, as well as a preferred embodiment for putting them into practice, it is indicated, that in the same, the materials, shapes, dimensions and in general, all those accessory or secondary characteristics which do not alter, change or modify its essentiality may be variable, and which are included in the following.

I claim:

1. Improved self-compensating dropper, for underground irrigation, essentially characterized in that it is provided at its out-put mouth (1) with a valve constituted by a sphere (2) of elastic material, with conical seat (3), placed in such a manner, that it permits the out-put of the liquid when it rises from its seat, pushed by the liquid vein, which flows through orifices (4) in the shape of circular crown segments, which remain between the attachment lugs (5) of a central stop (6) for retention of the sphere; whilst if the flow circulation direction is reversed, the elastic sphere (2) is compressed against its conical seat (3), closing the entrance to the dropper.

\* \* \* \* \*